United States Patent [19]
Faykish et al.

[11] Patent Number: 5,169,707
[45] Date of Patent: Dec. 8, 1992

[54] RETROREFLECTIVE SECURITY LAMINATES WITH DUAL LEVEL VERIFICATION

[75] Inventors: Lynn E. Faykish, Minneapolis; Douglas K. Fossum, Shoreview; Wallace K. Bingham, North St. Paul, all of Minn.

[73] Assignee: Minnesota Mining and Manufacturing Company, St. Paul, Minn.

[21] Appl. No.: 697,087

[22] Filed: May 8, 1991

[51] Int. Cl.$^5$ .............................................. B32B 9/00
[52] U.S. Cl. .................................... 428/195; 428/323; 428/402; 428/402.24; 428/403; 428/457; 428/913
[58] Field of Search ............. 428/402, 402.24, 403, 428/323, 195, 913, 457

[56] References Cited

U.S. PATENT DOCUMENTS

| | | | |
|---|---|---|---|
| 2,984,030 | 5/1961 | Hannon | 40/2.2 |
| 3,188,265 | 6/1965 | Charbonneau et al. | 161/188 |
| 3,188,266 | 6/1965 | Charbonneau et al. | 161/188 |
| 3,279,826 | 5/1964 | Rudershausen et al. | 283/7 |
| 3,414,998 | 6/1966 | Berger | 40/2.2 |
| 3,551,025 | 12/1970 | Bingham et al. | 350/105 |
| 3,767,291 | 10/1937 | Johnson | 350/237 |
| 3,801,183 | 4/1974 | Sevelin et al. | 350/105 |
| 3,827,726 | 8/1974 | McVoy et al. | 283/7 |
| 3,832,038 | 8/1974 | Johnson | 350/236 |
| 3,961,956 | 6/1976 | Fukuda et al. | 96/40 |
| 4,082,426 | 4/1978 | Brown | 40/615 |
| 4,099,838 | 7/1978 | Cook et al. | 350/105 |
| 4,102,562 | 7/1978 | Harper et al. | 428/323 |
| 4,151,667 | 5/1979 | Idelson et al. | 40/2.2 |
| 4,153,412 | 5/1979 | Bailey | 428/323 |
| 4,232,079 | 11/1980 | Raphael et al. | 428/195 |
| 4,268,117 | 5/1981 | Sevelin | 359/538 |
| 4,397,142 | 8/1983 | Bingham | 428/323 |
| 4,428,997 | 1/1984 | Shulman | 428/202 |
| 4,614,619 | 9/1986 | Shannon | 260/397.2 |
| 4,663,213 | 5/1987 | Bailey et al. | 428/210 |
| 4,763,985 | 8/1988 | Bingham | 359/536 |
| 4,856,857 | 8/1989 | Takeuchi et al. | 350/3.6 |
| 4,983,436 | 1/1991 | Barley et al. | 428/40 |

FOREIGN PATENT DOCUMENTS 89102182  8/1989  European Pat. Off. .
90306724  12/1990  European Pat. Off. .

OTHER PUBLICATIONS

ASTM D 1044-85, Standard Test Method for Resistance of Transparent Plastics to Surface Abrasion.
ASTM D 1474-85, Standard Test Methods for Indentation Hardness of Organic Coatings.

*Primary Examiner*—Patrick J. Ryan
*Assistant Examiner*—W. Krynski
*Attorney, Agent, or Firm*—Gary L. Griswold; Walter N. Kirn; Robert H. Jordan

[57] ABSTRACT

A retroreflective security laminate, designed to be applied to the surface of a document over information thereon, providing dual levels of verification. The laminates have primary legends which are viewable under both ordinary diffuse lighting conditions and retroreflective viewing conditions and may also have retro-legends which are viewable only under retroreflective viewing conditions.

18 Claims, 1 Drawing Sheet

RETROREFLECTIVE SECURITY LAMINATES WITH DUAL LEVEL VERIFICATION

FIELD OF THE INVENTION

The invention relates to retroreflective security films designed to be laminated to the surfaces of documents such as driver licenses and identification cards to provide means for authenticating the documents and means for enabling detection of alterations of the information contained therein.

BACKGROUND OF THE INVENTION

The retroreflective security films disclosed in U.S. Pat. No. 3,801,183 (Sevelin) provide many features making them well-suited for use as security overlays which can be laminated over a document or portions thereof. Such films are commonly used on such documents as identification cards, driver licenses, or documents of title, providing means for authenticating the documents as well as means for readily detecting tampering or attempted tampering therewith. Typically, such films are made with reflective layers which are substantially transparent in diffuse light conditions, thereby permitting the information on the document surface to be easily read. Commonly, the entire surface of the film has some level of retroreflection. Typically, any penetration of the film is disruptive to retroreflection by the film and is thus readily apparent under retroreflective viewing conditions, thereby providing means for enabling detection of tampering. Legends or patterns of enhanced retroreflection can be provided as desired in the form of logos, special messages, or other images to provide means for authentication as well as enhanced means for detection of tampering.

U.S. Pat. No. 4,099,838 (Cook et al.) discloses a retroreflective sheet material which carries retroreflective legends provided by a dielectric mirror wherein the mirror is patterned so that the reflectivity from the mirror exhibits a pattern of contrasting colors. The patent teaches that security films of the type disclosed in U.S. Pat. No. 3,801,183 may be made with such patterned reflectivity.

Retroreflective security laminates have come into widespread use, due in large part to the high degree of security they can provide. In order to make complete use of the full potential of their utility, they must be verified under retroreflective conditions, e.g., with a flashlight or specialized device such as a retroviewer such as disclosed in U.S. Pat. Nos. 3,767,291 (Johnson) and 3,832,038 (Johnson).

SUMMARY OF THE INVENTION

The present invention provides retroreflective security laminates which may be applied to documents, e.g., over visual information on the surfaces thereof, to provide means for authenticating the documents, means for deterring attempts to tamper with the documents and information thereon, and means for providing readily detectable indication of such tampering. The security laminates described herein provide a novel "dual verification" functionality which was not previously available. Security laminates of the invention provide both (1) an ambiently (i.e., under ordinary diffuse viewing conditions) inspected verification feature or image and (2) a retroreflective verification feature or image.

In brief summary, laminates of the invention comprise:

a) a base sheet comprising microspheres arranged in substantially a monolayer with partially-light-transmissive reflectors disposed behind the rear surfaces thereof, the microspheres being at least partially embedded in a transparent binder layer;

b) a cover sheet bonded to the front side of the base sheet; and c) a pattern of image-forming material visible as a directionally variable image, referred to herein as a primary legend.

The primary legend is visible under ordinary diffuse lighting conditions as well as retroreflective viewing conditions. The primary legend is typically disposed between the base sheet and the cover sheet, embedded within the cover sheet, or located on the face of the cover sheet. The appearance of the primary legend is directionally variable or directionally dependent (e.g., it may have different color or intensity at different viewing angles) under ordinary diffuse lighting conditions, and yet may be either substantially non-directionally dependent or directionally dependent under retroreflective viewing conditions.

In some embodiments, the base sheet further comprises a lacquer disposed behind the rear surfaces of some of the microspheres such that the laminate has retroreflective legend areas and retroreflective background areas, which areas are substantially transparent and substantially indistinguishable under ordinary diffuse light viewing conditions. By "substantially transparent" it is meant that under diffuse light conditions, except for the aforementioned primary legend, the laminate appears to be essentially transparent and free of a legend or that, if detectable by the unaided eye, the legend is too faint to substantially obscure the visual information on the document over which the laminate has been applied. One of the areas, i.e., either the background area or the legend area, has a greater retroreflective efficiency than the other whereby the legend areas are readily discernible from the background areas under retroreflective light viewing conditions. By virtue of this discernibility, the retroreflective background and legend areas form what is referred herein as a "retro-legend".

If desired, security laminates of the invention can incorporate special cover sheets so as to provide high resistance to abrasion, high resistance to deformation under moderate pressures such as are typically encountered by ordinary handling and use, and high resistance to accumulation of dirt. Accordingly, such security laminates can provide exceptional durability under varied conditions of use to which documents such as employee identification cards and driver licenses are typically subjected. Laminates of the invention can be made in flexible or rigid form, and can be adapted to be attached, i.e., adhesively bonded, to a variety of substrates, e.g., paper, plastic, photographs, etc., as desired.

The primary legend, which has a readily detectable appearance under ordinary diffuse lighting conditions, provides a first level of screening or verification that can be utilized simply and conveniently without any extra or special equipment. Its directionally variable characteristics facilitate detection of counterfeit and tampered documents. The retroreflective characteristics of the base sheet provide a second level of verification which is utilized under retroreflective conditions. This second level of verification can be enhanced with provision of a retro-legend as discussed above. By virtue of the unique conjunction of these first and second levels of verification, security laminates of the invention provide a higher degree of security and convenience than was heretofore available.

Security laminates of the invention are particularly useful when applied to documents such as identification cards, passports, driver licenses, credit cards, stock certificates, deeds, automobile titles, etc. The laminates can be used to provide means for identifying or authenticating the document including the visual information displayed thereon and means for deterring or rendering more difficult tampering with the document or counterfeiting of same. Other advantages of the laminates of the invention include the difficulty of removing the laminate from the document without destroying the structural integrity of the laminate thereby providing readily detectable indication of tampering, and the difficulty of duplicating or reproducing the laminate and the primary legends, and retro-legends, when utilized, contained therein without relatively sophisticated and expensive equipment.

BRIEF DESCRIPTION OF DRAWING

The invention will be further explained with reference to the drawing wherein.

These figures, which are idealized, are not to scale and are intended to be merely illustrative and nonlimiting. For instance, each circle represents a full circumference as though the microspheres were of uniform diameters and arranged in uniform rows. Furthermore, retro-legends and primary legends will normally be much wider than only a few microspheres as schematically illustrated.

DETAILED DESCRIPTION OF ILLUSTRATIVE EMBODIMENTS OF THE INVENTION

Figure 1:
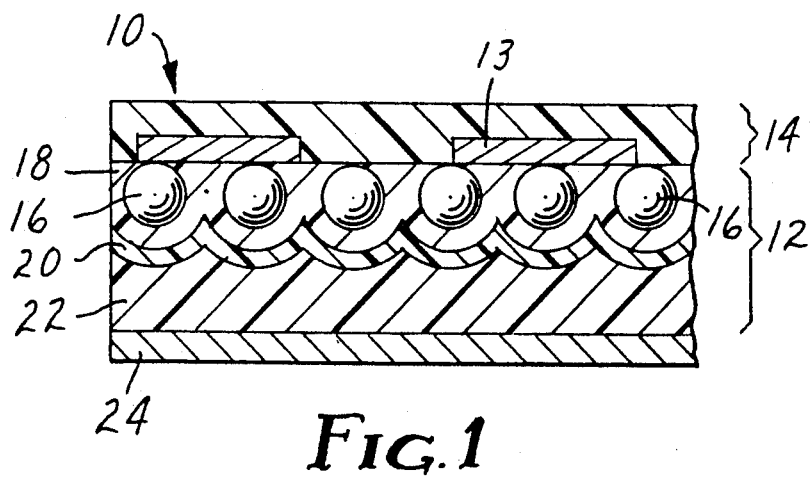
FIG. 1 is a cross-sectional illustration of a portion of a first illustrative embodiment of a security laminate of the invention.

FIG. 1 illustrates a portion of an illustrative embodiment of security laminate 10 of the invention. As shown in the figure, laminate 10 comprises base sheet 12 and cover sheet 14. Pattern 13 is disposed in front of the monolayer of microspheres 16. Base sheet 12 comprises microspheres 16 which are embedded in binder 18 with reflector 20 disposed behind the rear surfaces thereof. As shown, binder 18 provides a spacing layer immediately behind the rear surface of microspheres 16. Typically, laminate 10 further comprises attachment adhesive 22 on the back side thereof. Attachment adhesive 22 is typically covered by optional release liner 24.

The primary legend is made by a visible pattern of image-forming material disposed in front of the monolayer of microspheres, i.e., on the opposite side of the monolayer as the partially-light-transmissive reflectors and the same side of the monolayer as the cover sheet. As mentioned above, the pattern of image-forming material that forms the primary legend may be disposed at the interface of the cover sheet and the base sheet, it may be embedded within the cover sheet, or it may be disposed on the front surface of the cover sheet.

The pattern (e.g., pattern 13 in FIG. 1, pattern 113 in FIG. 2, or pattern 213 in FIG. 3) forms a directionally variable image. As discussed above, a directionally variable image is one that has a different color or intensity at different viewing angles under ordinary diffuse lighting conditions. Under retroreflective conditions the primary legend may be directionally variable or not, depending upon the embodiment. The image-forming material should have, at least at certain viewing angles, a sufficiently low transmittance, and preferably a distinctive color, that the pattern is readily discernible by the unaided eye from the surrounding portions of the laminate. It is often preferred that at other viewing angles, the pattern have a very high transmittance and be relatively indiscernible from the surrounding portions of the laminate such that underlying information on the document to which the laminate has been applied may be more easily read. As used herein, the viewing angles of a document are those angles at which the document can be read, typically a conical field having a full width of about 140° and centered on an axis substantially normal to the document.

Illustrative examples of image-forming materials which may be used to form directionally variable images or patterns herein include transparent holograms, nacreous pigment particles or flakes, liquid crystalline materials, etc. The pattern may be applied by many different methods, e.g., silk screening, flexo printing, or gravure printing techniques, or lamination of a preformed pattern. As will be understood by those skilled in the art, selection of a method for applying the pattern is dependent in part upon the image-forming material selected, the characteristics of the desired primary legend (e.g., its registration and complexity), and selection of the other component elements of the laminate being made.

A preferred image-forming material is nacreous pigment particles or flakes, usually arranged in an aggregation of multiple layers of overlapping flakes. Preferably, the pigment particles or flakes in the pattern are substantially uniformly oriented such that the pattern exhibits discernibly different light-reflecting characteristics when viewed from different angles under ordinary diffuse lighting conditions. Such differing characteristics might include changes in color or opacity with changes in viewing angle. For instance, at certain angles the cumulative reflection of the multiple layers of flakes is greatest, typically being great enough that the aggregation of flakes in the pattern tends to block the view of the underlying matter and the color of the primary legend is most pronounced. In contrast, when that same laminate is viewed at other angles, the reflective efficiency of flakes is lower. Accordingly, a greater portion of incident light is transmitted through the pattern, even through many layers of flakes. As a result, the primary legend appears fainter, perhaps substantially undetectable by unaided eye, and its color is muted, typically becoming more gray in tone. Under retroreflective viewing conditions, we have found that such nacreous patterns are visible as a dark image irrespective of the angle at which they are viewed.

Such image-forming materials are well known to those in the art. See, for example, U.S. Pat. No. 4,428,997 (Shulman). Illustrative examples of useful nacreous pigment particles include bismuth oxychloride, lead subcarbonate, titanium dioxide coated mica, and guanine. The nacreous pigment can be applied in the desired pattern by making and applying in imagewise fashion a printing composition of the desired material. For instance, an illustrative composition comprises about 15 to about 30 parts by weight of nacreous pigment and about 70 to 85 parts by weight of vehicle, i.e., binder resin, typically transparent, and solvent or dispersing agents. As will be understood by those skilled in the art, a sufficient amount of suitable liquid component to facilitate preparation and handling of the image-forming material is used. Many suitable liquids are known, including several organic solvents. Water is commonly preferred for environmental and cost reasons. It will be understood that other formulations can be used also.

The thickness of the pattern is typically between about 1 and about 50 microns (0.04 and 2 mils), preferably between about 2 and about 10 microns (0.08 and 0.4 mil), although patterns having thicknesses outside this range may be used. Patterns of nacreous materials which are too thin tend to reflect less light and exhibit less pearlescent brightness or sparkle and low visibility. Patterns of nacreous materials which are too thick tend to result in lower resolution, and although they exhibit greater pearlescent brightness or sparkle, they are not sufficiently transparent to permit viewing of underlying information on the document.

Another type of pattern which can be used herein is transparent holograms. For instance, U.S. Pat. No. 4,856,857 (Takeuchi et al.), which is incorporated herein by reference in its entirety, discloses transparent holograms having substantially continuous partially-light-transmissive reflective layers which may be used in security laminates of the invention. European Patent Application No. 89102182.6, Publication No. 0,328,086, published Aug. 8, 1989, (Mallik), which is incorporated herein by reference in its entirety, discloses holograms with non-continuous reflective layers which may be used as a pattern for primary legends in security laminates of the invention.

Holograms provide primary legends that are directionally variable under both ordinary diffuse lighting conditions and retroreflective conditions. Under ordinary diffuse lighting conditions, a holographic primary legend is visible, with desired colors and perhaps changing image perspective (such as with three dimensional holograms) within a holographic conical field of view, and is relatively less visible, sometime substantially undetectable when viewed at angles outside that conical field. Accordingly, documents bearing such laminates can be verified by examining the location, orientation, and appearance, of the primary legend, i.e., hologram, and then the information on the document can be read, substantially without interference, by viewing the document outside the holographic field of view.

Under retroreflective conditions, we have found that the holographic primary legend remains visible at angles within the same field of view as under diffuse lighting conditions. Depending upon the relative brightness of the hologram, the retroreflective brightness of the base sheet may be simultaneously visible with the holographic primary legend. When viewed under retroreflective conditions at angles outside the holographic field of view, the primary legend is typically no longer visible, however, the retroreflective brightness of the base sheet background is typically reduced relative to the retroreflective brightness of the surrounding areas. In instances where the laminate further comprises a retro-legend, we have found that the retro-legend is visible through the hologram when viewed outside the holographic viewing angle. In some instances, the retro-legend is also visible when viewed in the holographic viewing angle, i.e., the retro-legend is visible in conjunction with the primary legend. Thicker holograms typically tend to provide a brighter primary legend, but also tend to reduce the retroreflective brightness of the background and retro-legend, if any, of the base sheet when viewed within the holographic field of view. If desired, a holographic primary legend and retro-legend may be selected such that under retroreflective conditions, the retro-legend dominates the primary legend, even within the holographic field of view.

Another image-forming material which may be used herein is so-called "liquid crystalline" or "liquid crystal" materials such as the cholesteric liquid crystalline monomers disclosed in U.S. Pat. No. 4,614,619 (Shannon) which is incorporated herein by reference in its entirety. Prefabricated coatings of liquid crystalline type materials which may be used as primary legend patterns herein are available, e.g., ADVANTAGE TM Security Labels and Transfer Seals from Advantage Technology, Inc. of Greenbelt, Md.

Another example of an image-forming material that may be used in laminates of the invention are specularly reflective thin films. For example, U.S. Pat. No. 4,099,838 (Cook), which is incorporated herein in its entirety, discloses films which generate color images via thin film interference. See FIG. 1 and accompanying text therein.

The pattern is typically in the form of one or more alphanumeric characters, logos or other designs, but may extend substantially across the entire extent of the laminate Typically, holographic primary legends extend across large portions of the laminate, e.g., at least a square inch or more, so as to make full utility of the detail and resolution of which holograms are capable. An advantage of holographic primary legends is that they may be very vivid, highly detailed images, e.g., substantially photographic character in detail and resolution. In many instances, primary legends made of such materials as nacreous pigments or liquid crystalline type materials will be applied in fine line alphanumeric text or logos. An advantage of these primary legends is that they can be formed for security laminates by well-known printing techniques and can be easily customized by changing the printing pattern.

Referring to FIG. 1, microspheres 16 used herein are preferably substantially spherical in shape in order to provide the most uniform and efficient retroreflection. Furthermore, the microspheres are typically preferably substantially transparent so as to minimize the amount of light absorbed by the microspheres and thereby optimize the amount of light which is retroreflected and transmitted by laminates of the invention. Furthermore, the microspheres are typically preferably substantially colorless; although, in some instances, the microspheres may be colored to produce special effects if desired. Microspheres used herein may be made from glass or synthetic resin having the optical properties and physical characteristics taught herein.

Microspheres used in security laminates of the present invention will typically have an average diameter of between about 40 and about 200 microns. Microspheres which are smaller than this range may tend to provide lower levels of retroreflection because of diffraction effects, whereas microspheres larger than this range may tend to impart undesirably high thickness to resultant laminates or make laminates incorporating the same more susceptible to cracking when flexed. The refractive index of microspheres used in laminates of the present invention is typically between about 2.00 and about 2.60. It will be understood, however, that microspheres having refractive indices outside this range may be used in accordance with the present invention. As will be understood, the optimum index of refraction for microspheres in a laminate of the invention will depend in part upon the overall construction of the security laminate, i.e., whether the binder provides a spacing layer behind microspheres, the thickness of such spacing layer, thickness of the cover sheet, indexes of refraction of these elements, etc.

In order to form a laminate of the invention, the first step is typically to apply a mixture or slurry of selected microspheres in a binder composition on to a temporary carrier (not shown). The carrier is selected and/or treated so as to release from the binder layer and microspheres after formation of binder layer 18, e.g., after drying or curing. The carrier should also provide sufficient strength as well as sufficient stability when exposed to heat and chemicals to permit formation of the base sheet as described herein. Illustrative examples of materials useful as carriers include polyethylene terephthalate films and polymer-coated papers having the properties described herein.

After application of the slurry to the carrier, the microspheres typically settle to the surface of the carrier to become substantially arranged in a monolayer thereon with the microspheres typically being in substantially only tangential contact therewith. This side of the microspheres, which will ultimately be disposed toward the cover sheet, is referred to herein as the front of the microspheres. In some embodiments, the binder material preferably tends to conform to the rear surfaces of the microspheres so as to result in a layer having substantially uniform thickness thereon. In use, when the resultant laminate is applied to a substrate, e.g., a document, the rear surfaces of the microspheres will be disposed to the surface of the substrate.

The relative amounts of binder material and microspheres that are preferably used are based in part upon the size of the microspheres and the nature of the binder material used. Typically, an amount of binder material that provides a layer, referred to herein as a spacing layer, on the rear surfaces of the microspheres. It will be understood by those skilled in the art that reflector 20 is preferably located at approximately the focus point of the microspheres, i.e., is located behind the microspheres at a distance equivalent to the focal length thereof. As will be further understood, the focal point of microspheres in such constructions is dependent in part upon the index of refraction of the microspheres and the index of refraction of the binder layer(s) contacting the front and rear surfaces of the microspheres. In constructions wherein the ratio of the index of refraction of the microspheres is about 1.9 times that of the binder layer, the reflector is preferably located directly on the back surfaces of the microspheres (reflector 220 shown in FIG. 3) whereas if the ratio is somewhat lower, the reflector is preferably located at a position somewhat removed from the rear surfaces of the microspheres (reflectors 20 and 120 shown in FIGS. 1 and 2, respectively).

The location of the reflector with relation to the microspheres is independent of the location of the pattern of image-forming material which forms the primary legend. The primary legend pattern may be located on the front of the base sheet, in tangential contact with the fronts of the microspheres or may be spaced apart from the fronts of the microspheres, e.g., contained within the cover sheet or on its front surface.

The microspheres are typically preferably substantially uniform in size so that the resultant laminate will exhibit substantially more uniform retroreflective properties and in order to facilitate fabrication of the laminate. The binder material or composition is selected in part to provide a composition which will form, e.g., upon drying or curing, a binder layer which will adhere to the microspheres, and to later applied lacquer, reflector, and cover sheet. In addition, the resultant binder layer is preferably flexible, dimensionally stable such that the laminate will maintain its structural integrity when exposed to moderate temperatures and environments, e.g., upon exposure to high humidity, and have a suitable refractive index which will enable the laminate to provide desired retroreflection. Illustrative examples of binder materials which are useful in embodiments of the invention include polyvinyl butyral and polyester resins. Typically the binder layer will have a refractive index of between about 1.4 and about 1.6.

In one illustrative embodiment, microspheres which are substantially spherical and have an index of refraction of about 2.25 and an average diameter of about 60 micrometers will be useful with a binder material that comprises polyvinyl butyral and provides a spacing layer having a thickness of about 12 microns and a refractive index of between about 1.4 and about 1.5.

Figure 2:
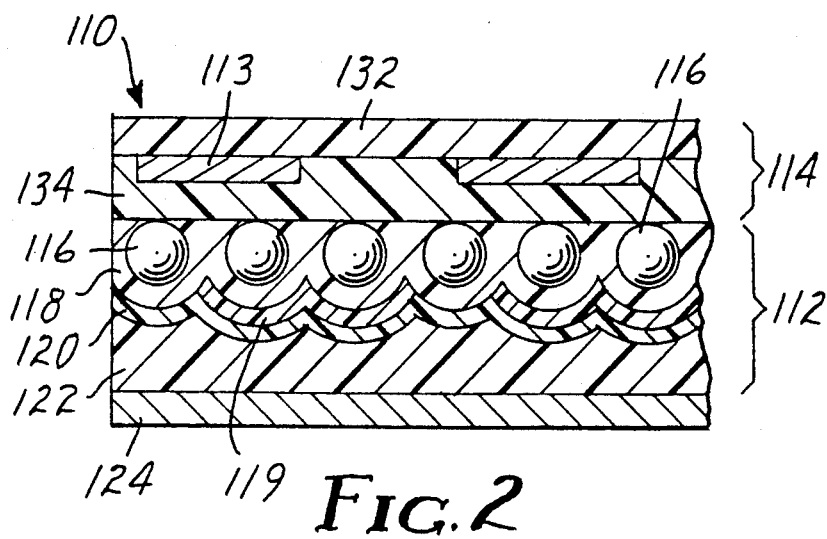
FIG. 2 is a cross-sectional illustration of a portion of a second illustrative embodiment of a security laminate of the invention.

If a retro-legend is desired, the pattern of differential retroreflective properties which forms such legend is provided by applying, in imagewise fashion, lacquer 119 to the back side of the spacing layer provided by binder layer 118, as shown in FIG. 2. The term "lacquer" is used herein to refer to any material, typically substantially transparent, which may be applied as discussed herein in discontinuous or imagewise fashion to delineate the legend areas and is not meant to refer to a particular class of resins. Lacquer 119 may be applied by any of several different well-known techniques, including but not limited to rotogravure or flexographic printing. Lacquer 119 may be applied in any desired image, e.g., in the form of one or more logos or alphanumeric characters. The retro-legend may contain a special message or instructions, or may simply be a pattern of a single or repeating characters. If desired, two or more different lacquers which provide somewhat different resultant retroreflective performance may be used in a single security laminate of the invention to provide special effects.

An illustrative example of a suitable lacquer is FLEXO ROTO Lacquer No. FA 14929 which is commercially available from Consolidated Printing Inks Company. Typically, it is preferred that lacquers used herein have a viscosity corresponding to a rating of between about 30 and about 60 seconds in a No. 2 Zahn cup, as such lacquers typically provide an optimum combination of handling characteristics and flow properties to enable formation of high resolution images or legends with reasonable cost and degree of difficulty. It will be understood, however, that lacquers having viscosities outside this range may be used in accordance with the present invention.

After imagewise application, and typically drying or curing, of lacquer 119, dielectric reflector 120 is formed over lacquer 119 and the exposed portions of the spacing layer in accordance with the teachings of the aforementioned U.S. Pat. No. 3,801,183 which is incorporated herein by reference.

A preferred material for use in dielectric mirror 120 is zinc sulfide (ZnS), which can be applied by any of several well-known vapor coating techniques. As is understood by those skilled in the art, the retroreflective efficiency, i.e., the fraction of incident light reflected back toward its source, depends in part on the efficiency of reflection of dielectric mirror 120 as well as the degree to which incident light is focused on dielectric mirror 120 by microspheres 116. One method for increasing the retroreflective efficiency of reflector 120 is to form a dielectric mirror comprising two or more layers of alternating high and low refractive index as is discussed in U.S. Pat. No. 3,801,183 For instance, a layer of zinc sulfide may be applied to the back of binder layer 118 and lacquer 119, and then a layer of a material having a relatively lower refractive index, e.g., cryolite ($Na_3AlF_6$) may be applied to the exposed surface of the first formed zinc sulfide and then in turn another layer of zinc sulfide applied to the back of the layer of cryolite. If desired, successive pairs of cryolite or similar material and zinc sulfide or similar material may be applied. Thus, reflector 120 may be single layer in some embodiments and may be multi-layer in other embodiments.

It is disclosed in the aforementioned U.S. Pat. No. 4,099,838, which is incorporated herein by reference, that the thickness of the elements of a dielectric layer may be controlled or "tuned" to preferentially reflect different segments of the color spectrum, i.e., to reflect in a desired color range. In this way, the retroreflective performances of the legend and background areas can be controlled so as to provide desired effects such as enhanced legibility by providing for contrasting colors and/or retroreflective efficiency between the legend and background areas. For instance, a yellow legend and purple-blue background can be provided. In some embodiments, the legend may be distinctly brighter than the background under retroreflective viewing conditions.

To achieve the brightest or most intense retroreflective brightness of white light, the optical thicknesses of the individual elements of the dielectric reflector preferably correspond to an odd-numbered multiple of one-quarter of one wavelength of light in the desired wavelength range, e.g., typically about 5000 to about 6000 angstroms.

U.S. Pat. No. 4,099,838 also discloses a property defined therein as a "sticking coefficient" (see column 3, lines 25-49) which relates to the tendency of vapor coated materials, e.g., zinc sulfide, to be deposited more quickly on some surfaces than on others. For example, in some instances the zinc sulfide may be deposited upon the exposed portions of the binder layer more quickly than it does on the lacquer. This phenomenon may thus result in a dielectric reflector layer having different optical thickness at different points so as to have different retroreflective properties at those points.

Referring again to FIG. 1, following completion of reflector 20, base sheet 12 is typically completed by application of attachment adhesive 22 over reflector 20, although it will be understood that attachment adhesive 22 may also be applied after completion of the other elements of the laminate. In many applications, attachment adhesive 22 is used to adhere the resultant security laminate to the face of a document, typically over a portion of the document on which information is displayed. Accordingly, attachment adhesive 22 is selected to provide adhesion to the desired substrate and is preferably substantially transparent. If desired, attachment adhesive 22 can be a hot melt adhesive formulation such that the resultant laminate is applied to a document by heat lamination. In some embodiments, attachment adhesive 22 may be pressure-sensitive in nature. Typically, attachment adhesive 22 is preferably substantially colorless, although if desired it may be colored to achieve special effects. Typically, attachment adhesive 22 is preferably quite stable such that it does not change color or substantially weaken in bonding strength as it ages. Preferably, attachment adhesive 22 is selected to provide a bond to reflector 20 and to the ultimate substrate (not shown) which is stronger than the interlayer adhesion of the other elements of security laminate 10 and/or the substrate such that attempts to remove the laminate 10 from the document in order to tamper with the document will result in readily visible damage to the laminate or document. Illustrative examples of materials useful as attachment adhesives herein include high molecular weight thermoplastics, e.g., ethylene/acrylic acid copolymers, such as PRIMACOR 1410 and DAF 808 which are commercially available from Dow Chemical Company. Typically, attachment adhesive 22 will be a substantially continuous layer which is between about 40 and about 80 microns in thickness.

In some instances, attachment adhesive 22 will comprise a layer made up of segments of more than one kind of adhesive. For instance, the layer may be made up of a pattern of segments of a first kind of adhesive which preferentially adheres to reflector 20 and a second kind of adhesive which adheres less strongly to reflector 20 such that it preferentially releases from reflector 20 and thus preferentially adheres to the ultimate document to which the laminate is applied such that, after application to the document and upon application of a peel force, attachment adhesive 22 will separate in the aforementioned pattern to provide an indication of attempted removal.

Typically, attachment adhesive 22 will be covered with temporary release liner 24 prior to application of the laminate to a substrate. In many instances, it will be desired to impart a matte finish to the bottom surface (i.e., the surface which is bonded to the substrate) of attachment adhesive 22 as a matte finish typically improves the tendency of the adhesive to wet the surface of the document to which the resultant laminate is being applied. In some instances, if the bottom of attachment adhesive 22 has a highly glossy finish, air bubbles may tend to become entrapped, thereby impairing the bond which is achieved.

The cover sheet protects the base sheet of the laminate such that the laminate will retain its retroreflective verification features during use, and preferably protects the pattern of image-forming material which forms the primary legend as well. The cover sheet, which may be colorless or tinted as desired, may comprise a single layer as shown in FIG. 1 (cover sheet 14) or may comprise more than one layer as shown in FIGS. 2 (cover sheet 114) and 3 (cover sheet 214). It is typically preferred that the cover sheet be highly transparent so as to facilitate any underlying information and permit clear inspection of the primary legend and, in embodiments where present, the retro-legend.

Monolayer cover sheets may be provided by laminating a preformed film to the front of the base sheet or forming a film on the base sheet such as by extruding a film-forming composition thereon or flood coating liquid film-forming resin and forming the cover sheet in situ. The cover sheet is preferably made of a material which will adhere firmly to the base sheet, either due to its inherent properties or with adhesion promoting treatments such as priming or corona treatment.

Figure 3:
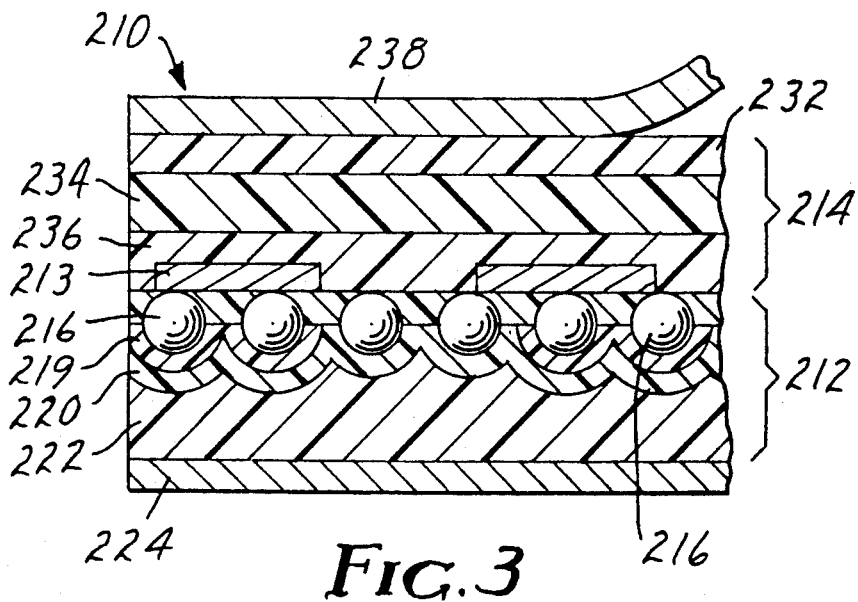
FIG. 3 is a cross-sectional illustration of a portion of a third illustrative embodiment of a security laminate of the invention.

In some instances, however, a multilayer cover sheet may be used to optimize several desired properties. An illustrative embodiment is shown in FIG. 3 wherein cover sheet 214 comprises outer layer 232, support layer 234, and optional bonding layer 236. Such cover sheets, as disclosed in European Patent Application No. 90.306724.7, have been found to exhibit exceptional durability. Pattern 213 is shown between base sheet 212 and cover sheet 214.

Outer layer 232 is typically selected to exhibit high resistance to conditions to which the resultant laminate is likely to be subjected, such as abrasion, exposure to deleterious agents, etc. Thus, outer layer 232 comprises a durable, tough material. Depending in part upon the application for which the security laminate is being prepared, films of many different polymers and copolymers could be used in outer layer 232. Illustrative examples of preferred abrasion-resistant materials for use in outer layer 232 include high molecular weight thermoplastic copolymers which are inherently tough, of which ionomeric ethylene methacrylic acid copolymers such as SURLYN 9910 which is commercially available from Du Pont are preferred examples. Other useful examples include ethylene acrylic acid copolymers such as PRIMACOR 1420 which is commercially available from Dow Chemical Company. In a typical embodiment, outer layer 232 is between about 10 and about 40 microns (0.5 and 1.5 mils) thick.

By "abrasion-resistant" it is meant that the outer layer is resistant to damage such as a substantial reduction in optical clarity or transparency when subjected to abrasive forces such as encountered by a card being inserted into a wallet. Abrasion resistant outer layers also improve the resistance of the laminate incorporating same to accumulation of dirt by tending to retain a smooth surface rather than easily developing gouges and roughened portions which might readily collect dirt. As used herein, the term "abrasion-resistant" materials means to materials which, after 100 abrasion cycles in accordance with ASTM D-1044-85, which is incorporated herein by reference, suffer an increase in percent haze of less than about 20 percent and preferably less than about 10 percent. For instance, films of the aforementioned SURLYN 9910 have been observed to suffer an increase in percent haze of only about 8 percent after this test. In comparison, certain conventional polyester films have been observed to suffer increases in percent haze of over 40 percent.

Support layer 234 is selected to impart other desired properties to cover sheet 214 and the overall laminate into which it is to be incorporated. For instance, in a preferred embodiment, structural layer 234 is selected to impart improved resistance to deformation under localized pressure, such as might be encountered by pressing with a pen on a security laminate which is mounted on a document. Another common source of pressure is when a document bearing a laminate of the invention is located next to the face of an embossed credit card in a wallet which is being carried in the hip pocket of a person. When the person sits, the wallet and its contents are typically subjected to compressive forces such that the portions of the document abutting the embossed characters of the credit card may be subjected to substantial point pressures. Such pressures may tend to damage the laminate or cause it to degrade or wear, thereby shortening the effective life of the anti-tampering properties thereof or even damaging the laminate so severely that the document becomes unreadable under diffuse lighting conditions.

Support layer 234 should resist deformation under probable point pressures to which the security laminate is expected to be subjected to during use and to which the laminate is intended to withstand. For instance, as mentioned above, a laminate may be written on or it may be pressed against nonplanar objects while subjected to substantial pressures. Thus, the support layer should provide sufficient tensile strength such that the laminate will resist deformation under such pressures, thereby protecting the other elements of the laminate, particularly the critical arrangement of microspheres and reflector from unwanted changes in arrangement. It is believed that film materials that are at least about 25 microns (1 mil) thick and have a Young's Modulus of between about 2000 and about 6000 MegaPascals (MPa), preferably between about 3500 and about 5500 MPa, will exhibit the desired properties to function as a support layer herein. Accordingly, materials having Young's Moduluses in those ranges are referred to herein as "resistant to deformation under localized pressure". "Young's Modulus" or modulus of elasticity is defined in the Encyclopedia of Polymer Science & Engineering, 2nd ed., vol. 7, pp. 82–85, as "a measure of the force that is required to deform the film to a certain degree" and is also "a measure of the intrinsic stiffness of the film".

Alternatively, the "resistance to deformation under localized pressure" of a material is indicated by its Knoop Hardness as determined in accordance with ASTM D-1474-85, which is incorporated herein by reference. Film materials that are at least about 25 microns (1 mil) thick and have a Knoop Hardness of at least about 10, and preferably at least about 20, are considered to be herein "resistant to deformation under localized pressure". For instance, support layers in cover sheets of the invention can be made using polyester films having Knoop Hardnesses of at least 15 and in some instances at least 20.

An illustrative example of a preferred structural layer is film of polyethylene terephthalate, i.e., polyester, typically between about 25 and about 50 microns (1 and 2 mils) thick. Other illustrative examples include cellulose acetate, polystyrene, polycarbonate, and polyvinyl chloride films. Such materials provide increased tensile strength and resistance to distortion under localized pressure.

Bonding layer 236 comprises a layer which will provide a strong bond to the adjacent element of cover sheet 214, e.g., support layer 234, and base sheet 212. In many embodiments, bonding layer 236 may comprise a layer of adhesive. A preferred adhesive is a layer, between about 15 and about 50 microns (0.5 and 2 mils) thick, of high-melt-index, e.g., between about 10 and 50, thermoplastic film such as PRIMACOR 3440 or 3460 or ethylene/vinyl acetate copolymers such as ELVAX 250 from Du Pont. Such adhesives can be used to join a previously assembled base sheet and cover sheet to yield a security laminate of the invention. Typically, cover sheet 214 and base sheet 212 will be joined together by heat lamination to yield the resultant security laminate.

In some embodiments, as shown in FIG. 2, a single layer 134 having suitable properties may be used in place of separate support and bonding layers. Outer layer 132 can have the properties similar to outer layer 232 discussed above.

Referring again to FIG. 3, in many instances, particularly wherein cover sheet 214 comprises an assembly of several layers, cover sheet 214 may be on temporary liner 238 used to facilitate handling and preparation of the cover sheet. An illustrative example of a suitable liner is a film of polyethylene terephthalate. Typically, the liner is between about 20 and about 80 microns thick although it will be understood that liners having thicknesses outside this range may be used if desired.

The inside surface of liner 238, i.e., the surface on which cover sheet 214 is carried, preferably has a very smooth, i.e., glossy, finish. As mentioned above, laminates of the invention may be applied to documents by methods employing heat to activate the attachment adhesive. Under such conditions, the outer surface of outer layer 232 may tend to soften so as to assume surface features of liner 238. Accordingly, liner 238 is preferably very smooth so as to yield a glossy outer surface on outer layer 232 which is desired for optimum retroreflection by minimizing the diffuse reflection which is associated with surfaces having matte finishes. In addition, liner 238 should be "temperature resistant", i.e., it should not change so as to lose the desired release properties with respect to cover sheet 214 or become dimensionally unstable, e.g., tending to shrink or stretch so as to spoil laminate 210, when heated to activate a heat-activated attachment adhesive. As used herein, "temperature resistant" materials are materials which are sufficiently dimensionally stable that when heated to between about 90° C. and about 175° C. (200° F. and about 350° F.) they shrink or expand only about 3 percent or less.

In a preferred method of forming security laminate 210 of the invention, cover sheet 214 is a multilayer construction fabricated by extruding thermoplastic outer layer 232 and bonding layer 236 to opposite sides of support layer 234. Strong interfacial adhesion between the various layers can be provided by priming the layers, e.g., by corona or plasma treatment, or utilizing a process for enhancing the adhesion therebetween, such as is disclosed in U.S. Pat. Nos. 3,188,265 (Charbonneau) and 3,188,266 (Charbonneau). Alternatively, outer layer 232 and bonding layer 236 may be extruded onto support layer 234 after treating of the latter on one or both sides with adhesion promoting primer(s). As will be understood, the particular means useful for providing the desired interfacial adhesion will depend in part upon the particular materials used in the subject layers and may be readily determined by trial and error.

Referring again to FIG. 1, in some embodiments, attachment adhesive 22 may be selected so as to provide a compatible bond or adhesion to special surfaces. Alternatively, an additional layer (not shown) of special adhesive or other material can be applied to provide means for compatibly bonding with documents having special surface characteristics, e.g., photographic emulsions or images prepared by thermal dye transfer techniques. By "compatibly bond" it is meant to bond without undesired degradation of the substrate, e.g., fading or smearing of the information such as by the break down of an imaged photographic emulsion due to agents in the attachment adhesive, but with high adhesion such that the laminate cannot be removed by peeling without visibly damaging the substrate so as to provide readily apparent indication of tampering. In an illustrative embodiment, Polaroid Corporation's Adhesive Solution No. 2 is rotogravure coated onto the back side of the attachment adhesive to provide compatibility with Polaroid's wet photographic films. In another illustrative embodiment, a layer of VITEL 222 polyester resin from Goodyear is solution coated onto the attachment adhesive layer to provide compatibility with thermally imaged dye receptive surfaces, which comprise selectively deposited dyes transferred by thermal dye transfer to a dye-receptor treated substrate.

In some instances, increased retroreflective efficiency can be obtained in constructions wherein the reflector is in direct contact with the rear surfaces of the microspheres. U.S. Pat. No. 3,551,025 (Bingham) discloses an enclosed-lens retroreflective sheeting wherein the refractive indices of the microspheres and binder material are such that the reflector layer is in direct contact with the rear surfaces of the microspheres. FIG. 3 illustrates an embodiment of security laminate 210 of the invention, wherein dielectric reflector 220 is in direct contact with microspheres 216 except where spacing results from the presence of selectively deposited lacquer 219. As is understood, in order for incident light to focus at the rear surfaces of microspheres 216, and accordingly on reflector 220, microspheres 216 must have indices of refraction of about 1.9 times that of binder material 218 in which the monolayer of microspheres is embedded. For instance, microspheres having an index of refraction of about 2.58 could be used in a binder material having an index of refraction of about 1.38. Many organic resins having refractive indices in this range will be known to those skilled in the art.

Laminate 210 can be made by coating binder material 218, e.g., a fluorinated resin such as Du Pont VITON A, having an index of refraction of about 1.38, directly onto cover sheet 214 and then cascading microspheres 216 having a refractive index of about 2.58 thereinto such that they are partially, preferably substantially hemispherically, embedded therein. Lacquer 219 is then selectively printed directly on the exposed rear surfaces of microspheres 216, and then dielectric reflector 220, e.g, a vapor coated layer of zinc sulfide, applied thereto. Attachment adhesive 222 can then be applied thereto.

EXAMPLES

The invention will be further explained by the following illustrative examples which are intended to be nonlimiting. Unless otherwise indicated, all amounts are expressed in parts by weight.

EXAMPLE 1

A base sheet was formed by notch bar coating a slurry of microspheres in a binder composition on to a temporary release liner. The binder comprised:

| Amount | Component |
|--------|-----------|
| 2.8 | Water; |
| 29.0 | Xylol; |
| 15.0 | BUTVAR B-90 - polyvinyl butyral resin from Monasanto; |
| 43.7 | N-butanol; |
| 6.0 | UFORMITE F240 - urea formaldehyde from Reichhold Chemicals; and |
| 3.5 | AROPLAZ 1351 - alkyl resin from Spencer Kellogg. |

The microspheres were glass microspheres having an average diameter of about 60 microns and an index of refraction of about 2.25. The slurry was made with a binder to microspheres weight ratio of about 1.86:1. The microspheres settled to the carrier, substantially assuming a monolayer arrangement, and then the binder composition was cured by air drying for about 10 minutes, and then heating in an oven at about 65° C. (150° F.) for about 5 minutes and then in an oven at about 125° C. (260° F.) for about 7 minutes to form a binder layer having a spacing layer of about 12 microns thick behind the rear surfaces of the microspheres.

A lacquer of FLEXOTUF Varnish, a polyamide ink from Inmont, diluted with ethanol to a viscosity corresponding to a rating of about 30 seconds in a #2 Zahn cup was rotogravure printed in image-wise fashion using a plate press onto the spacing layer and the construction heated in an oven at about 65° C. (150° F.) for about 2 minutes to dry the printed lacquer.

A reflector was then formed by vapor coating a zinc sulfide layer of about one-half of one wavelength thickness on the exposed spacing layer and lacquer in a bell jar vacuum chamber according to standard techniques.

DAF 808, an ethylene/acrylic-acid adhesive from Dow, was laminated over the reflector to form the attachment adhesive in a layer about 50 microns (2 mils) in thickness to yield the finished base sheet.

A cover sheet was then formed by bonding together, in accordance with U.S. Pat. Nos. 3,188,265 and 3,188,266, an outer layer of a 1 mil (25 microns) thick film of SURLYN 9910 from Du Pont, a support layer of 40 microns (1.5 mils) thick film of polyester, and a bonding layer of a 25 microns (1 mil) thick film of PRIMACOR 1420 from Dow Chemical.

A printing composition comprising:

| Amount | Component |
| --- | --- |
| 30 | Pigment - MEARLIN HI-LITE TM Gold 9220C Pearlescent Pigment, a titanium dioxide coated mica, particle size 6 to 48 microns, from Mearl Corp.; |
| 65 | Binder - PANTONE TM White SSW-4010 Clear Ink from Werneke, believed to be a water-based acrylic resin; |
| 5 | Water; | was then printed on the exposed surface of the bonding layer of the cover sheet to provide the desired primary legend. The composition had a viscosity of about 300 centipoise, was flexographically printed with a 59 line/centimeter (150 line/inch) anilox roll operating at 53.3 meters/minute (175 feet/minute) and then oven dried at 132° C. (270° F.).

The temporary carrier was then removed from the base sheet and the base sheet and the cover sheet then heat laminated together at an interface temperature of about 150° C. (300° F.) with a lamination liner (50 micron thick polyester film) contacting the outer surface of the outer layer of the cover sheet.

The release liner was removed from the attachment adhesive and the security laminate then hot laminated to an identification card. The lamination liner was then stripped from the cover sheet.

Under diffuse lighting conditions the laminate was substantially transparent except for the primary legend which was specularly reflective and changed colors from vivid and sparkly gold to barely discernible gray when viewed from different angles.

Under retroreflective viewing conditions, the background region appeared blue-green while the retro-legend (lacquer areas) appeared yellow. The primary legend appeared as a dark, non-directionally dependent logo.

EXAMPLE 2

A base sheet was prepared and a cover sheet laminated to the front surface thereof as in Example 1 except the nacreous composition was omitted. A transparent volume hologram in an adhesive-backed polymer film, total thickness 50 microns (2 mils), was laminated to the front surface of the cover sheet.

The hologram had a bright green appearance under ordinary diffuse lighting conditions within its holographic field of view (30° across) and appear as a gray, transparent spot outside its holographic field of view. Under retroreflective viewing conditions, the primary legends exhibited similar directionally dependent appearance. The retro-legend was visible at all angles, although it was somewhat dimmer in the region within the primary legend when viewed within the holographic field of view than in other portions of laminate and when viewed at other angles.

EXAMPLE 3

• A base sheet was prepared as in Example 1.

An ADVANTAGE TM Security Label, comprising a 200 micron (8 mil) thick adhesive-backed polyester film, was applied to the front surface of the base sheet to provide the primary legend.

The primary legend was visible as an orange or green image at different angles under diffuse lighting conditions. Under retroreflective viewing conditions, the blue-green retroreflective background was visible and, except for being somewhat less bright, the primary legend was visible similarly as under diffuse lighting conditions.

Various modifications and alterations of this invention will become apparent to those skilled in the art without departing from the scope and spirit of this invention.

What is claimed is:

1. A substantially transparent laminate comprising:
    a) a base sheet comprising microspheres arranged in substantially a monolayer with partially-light-transmissive reflectors disposed behind the rear surfaces thereof, said microspheres being at least partially embedded in a transparent binder layer;
    b) a cover sheet bonded to the front side of said base sheet; and
    c) a pattern of image-forming material disposed on the same side of said microspheres as said cover sheet;
wherein said pattern is visible as a primary legend under ordinary diffuse light viewing conditions and under retroreflective light viewing conditions, said legend being a substantially directionally variable image under ordinary diffuse light viewing conditions.

2. The laminate of claim 1 wherein said pattern comprises at least one of the following: nacreous pigment particles or flakes, transparent hologram, liquid crystalline material, or specularly reflective thin films.

3. The laminate of claim 2 wherein said pattern comprises at least one of the following nacreous pigments: bismuth oxychloride, lead subcarbonate, titanium dioxide coated mica, or guanine.

4. The laminate of claim 3 wherein said pattern is between about 2 and about 10 microns thick.

5. The laminate of claim 1 wherein said pattern is disposed between said cover sheet and said base sheet.

6. The laminate of claim 1 wherein said pattern is within said cover sheet.

7. The laminate of claim 1 wherein said pattern is disposed on the face of said cover sheet.

8. The laminate of claim 1 wherein said cover sheet further comprises a bonding layer which bonds said cover sheet to said base sheet.

9. The laminate of claim 1 wherein said base sheet further comprises lacquer disposed behind the rear surfaces of some of said microspheres such that said laminate has retroreflective retro-legend areas and retroreflective background areas, which areas are substantially transparent and substantially indistinguishable under ordinary diffuse light viewing conditions, said retro-legend areas and said background areas having visually distinguishable retroreflective properties whereby said retro-legend areas are readily discernible from said background areas under retroreflective light viewing conditions.

10. The laminate of claim 9 wherein said retro-legend areas retroreflect a different color distribution than the background areas.

11. The laminate of claim 9 wherein said retro-legend areas have different retroreflective efficiency than do said background areas such that said retro-legend areas are readily discernible from said background areas under retroreflective conditions.

12. The laminate of claim 9 wherein said pattern comprises at least one of the following: nacreous pigment particles or flakes, transparent hologram, liquid crystalline material, or specularly reflective thin films.

13. The laminate of claim 12 wherein said pattern comprises at least one of the following nacreous pigments: bismuth oxychloride, lead subcarbonate, titanium dioxide coated mica, or guanine.

14. The laminate of claim 13 wherein said pattern is between about 2 and about 10 microns thick.

15. The security laminate of claim 9 wherein, when viewed under retroreflective viewing conditions, said retro-legend is visible in conjunction with said primary legend.

16. The laminate of claim 1 further comprising an attachment adhesive on the back side of said base sheet.

17. A secured document comprising an information surface having information displayed on at least a portion thereof, said document further comprising a security laminate of claim 1 bonded thereto with an attachment adhesive such that said laminate covers at least a portion of said information.

18. The laminate of claim 1 wherein said primary legend is substantially transparent and relatively indiscernible from surrounding portions of the laminate at some viewing angles under ordinary diffuse lighting conditions.

* * * * *